United States Patent
Yamamoto et al.

(10) Patent No.: US 7,059,209 B2
(45) Date of Patent: Jun. 13, 2006

(54) SHIFT ACTUATOR FOR A TRANSMISSION

(75) Inventors: Yasushi Yamamoto, Kanagawa (JP); Masafumi Taki, Saitama (JP); Kenji Mikajima, Saitama (JP)

(73) Assignee: Isuzu Motors Limited, Tokyo (JP)

( * ) Notice: Subject to any disclaimer, the term of this patent is extended or adjusted under 35 U.S.C. 154(b) by 125 days.

(21) Appl. No.: 10/813,053

(22) Filed: Mar. 31, 2004

(65) Prior Publication Data

US 2004/0187618 A1 Sep. 30, 2004

(30) Foreign Application Priority Data

Mar. 31, 2003 (JP) ............................. 2003-095085
Feb. 6, 2004 (JP) ............................. 2004-030145

(51) Int. Cl.
*F16H 59/00* (2006.01)
*F16H 17/12* (2006.01)
*F16H 20/00* (2006.01)
*B60K 17/04* (2006.01)

(52) U.S. Cl. .................. 74/335; 74/473.12; 74/473.23

(58) Field of Classification Search .................. 74/335, 74/473.1, 473.12, 473.13, 473.21, 473.23
See application file for complete search history.

(56) References Cited

U.S. PATENT DOCUMENTS

| 4,631,984 | A  | * | 12/1986 | Jones ....................... 74/473.12 |
| 5,261,456 | A  | * | 11/1993 | Patton et al. .......... 137/625.64 |
| 6,487,927 | B1 | * | 12/2002 | Sputhe .................... 74/473.23 |
| 6,880,422 | B1 | * | 4/2005  | Yamamoto ............... 74/473.12 |
| 6,889,573 | B1 | * | 5/2005  | Hayashi et al. .......... 74/473.12 |
| 2003/0000323 | A1 | * | 1/2003 | Suzuki et al. ................. 74/335 |

FOREIGN PATENT DOCUMENTS

| DE | 33 668 A | 12/1964 |
| DE | 101 02 031 A1 | 9/2001 |
| EP | 1 225 374 A | 7/2002 |
| EP | 1 275 886 A | 1/2003 |
| JP | 2004293680 A | * 10/2004 |

* cited by examiner

*Primary Examiner*—Tisha Lewis (57) ABSTRACT

A shaft actuator for a transmission. A first electromagnetic solenoid is provided to operate a shifting mechanism of the transmission to a first shifted position. A second electromagnetic solenoid is provided to operate the shifting mechanism to a second shifted position. A neutral operation member is mounted on the shifting mechanism to bring the shifting mechanism to a neutral position lying between the first shifted position and the second shifted position. A neutral limitation member can move to a first position, where the neutral operation member is permitted to be operated to the first shifted position and to the second shifted position, and to a second position, where the neutral operation member is brought to the neutral position. An electromagnetic solenoid for neutral can bring the neutral limitation member to the second position.

5 Claims, 7 Drawing Sheets

SHIFT ACTUATOR FOR A TRANSMISSION

FIELD OF THE INVENTION

The present invention relates to a shift actuator for operating a shifting mechanism of a transmission mounted on a vehicle.

DESCRIPTION OF THE RELATED ART

As a shift actuator for operating a shifting mechanism of a transmission, there is generally used a fluid pressure cylinder by using a fluid pressure such as a pneumatic pressure or a hydraulic pressure as a source of operation. The shift actuator employing the fluid pressure cylinder requires piping for connection to the source of fluid pressure, requires an electromagnetic change-over valve for changing over the flow passage of the operation fluid and requires space for arranging them, resulting in an increase in weight of the device as a whole.

In recent years, further, there has been proposed an actuator of the type of an electric motor as a shift actuator for a transmission mounted on a vehicle which is equipped with neither a source of compressed air nor a source of hydraulic pressure. As the shift actuator constituted by the electric motor needs neither the piping for connection to the source of fluid pressure nor the electromagnetic change-over valve unlike the actuator employing the fluid pressure cylinder, the device as a whole can be constituted in a compact size and in a reduced weight. The actuator using the electric motor, however, requires a speed reduction mechanism for obtaining a predetermined operation force. As the speed reduction mechanisms, there have been proposed the one using a ball-screw mechanism and the one using a gear mechanism. The actuators using the ball-screw mechanism and the gear mechanism are not always satisfactory in durability of the ball-screw mechanism and of the gear mechanism and in endurance of the electric motor, and in the operation speed.

JP-A 2002-213606 discloses a shift actuator for a transmission, using an electromagnetic solenoid as an actuator that has excellent durability and a high operation speed.

In the shift actuator for the transmission, it is required that a speed-changing mechanism is stopped at a neutral position. Due to its structure, however, the electromagnetic solenoid moves to a position where the electromagnetic coil is excited and to a position where the electromagnetic coil is not excited and hence, it is very difficult to bring the electromagnetic solenoid to a halt at an intermediate position. To bring the electromagnetic solenoid to a halt at the intermediate position, a feedback control is worked based on a detection signal from a shift stroke position detection means. However, the electromagnetic solenoid that operates at a high speed results in an increased overshooting and does not necessarily satisfactory from the standpoint of certainty.

SUMMARY OF THE INVENTION

It is therefore an object of the present invention to provide a shift actuator for a transmission, in which an electromagnetic solenoid that can be reliably brought to the neutral position is used.

In order to achieve the above object, the present invention provides a shaft actuator for a transmission comprising a first electromagnetic solenoid for operating a shifting mechanism of the transmission to a first shifted position, and a second electromagnetic solenoid for operating the shifting mechanism to a second shifted position, the shift actuator for a transmission further comprising:

a neutral operation member that is mounted on the shifting mechanism and brings the shifting mechanism to a neutral position lying between the first shifted position and the second shifted position;

a neutral limitation member that can move to a first position where the neutral operation member is permitted to be operated to the first shifted position and to the second shifted position, and can move to a second position where the neutral operation member is brought to the neutral position; and an electromagnetic solenoid for neutral, which brings the neutral limitation member to the second position.

The neutral limitation member has two operation surfaces formed in a V-shape so as to act on said neutral operation member, and, when brought to the second position, brings the neutral operation member to the neutral position and limits its operation.

The neutral operation member comprises a cam that is mounted on a shifting shaft constituting the shifting mechanism and has a cam surface on the outer periphery thereof, and the neutral limitation member has a hole with cam operation surfaces that surround the cam and act on the cam surface and, when brought to the second position, brings the cam to the neutral position and limits its operation.

Further, the neutral operation member comprises a roller support member that is mounted on the shifting shaft constituting the shifting mechanism and protrudes in the radial direction, and a roller that is supported at an end of the roller support member and can rotate on the axis in parallel with the shifting shaft, and the neutral limitation member has a hole with roller operation surfaces that surround the roller support member and the roller, and act on the roller and, when brought to the second position, brings the roller to the neutral position and limits its operation. It is desired to provide a guide portion for guiding the movement of the neutral limitation member between the first shifted position and the second shifted position. It is desired that a slide bush made of a material having a small coefficient of friction is fitted into the guide portion.

As described above, the shift actuator for the transmission according to the invention comprises a neutral operation member mounted on the shifting mechanism, a neutral limitation member that operates to a first position where the neutral operation member is permitted to be operated to the first shifted position and to the second shifted position, and operates to a second position where the neutral operation member is brought to the neutral position lying between the first shifted position and the second shifted position, and an electromagnetic solenoid for neutral, which brings the neutral limitation member to the second operation position. Therefore, the shifting mechanism of the transmission is reliably brought to the neutral position.

DETAILED DESCRIPTION OF THE PREFERRED EMBODIMENTS

Preferred embodiments of a shift actuator for a transmission constituted according to the present invention will now be described in further detail with reference to the accompanying drawings.

Figure 1:
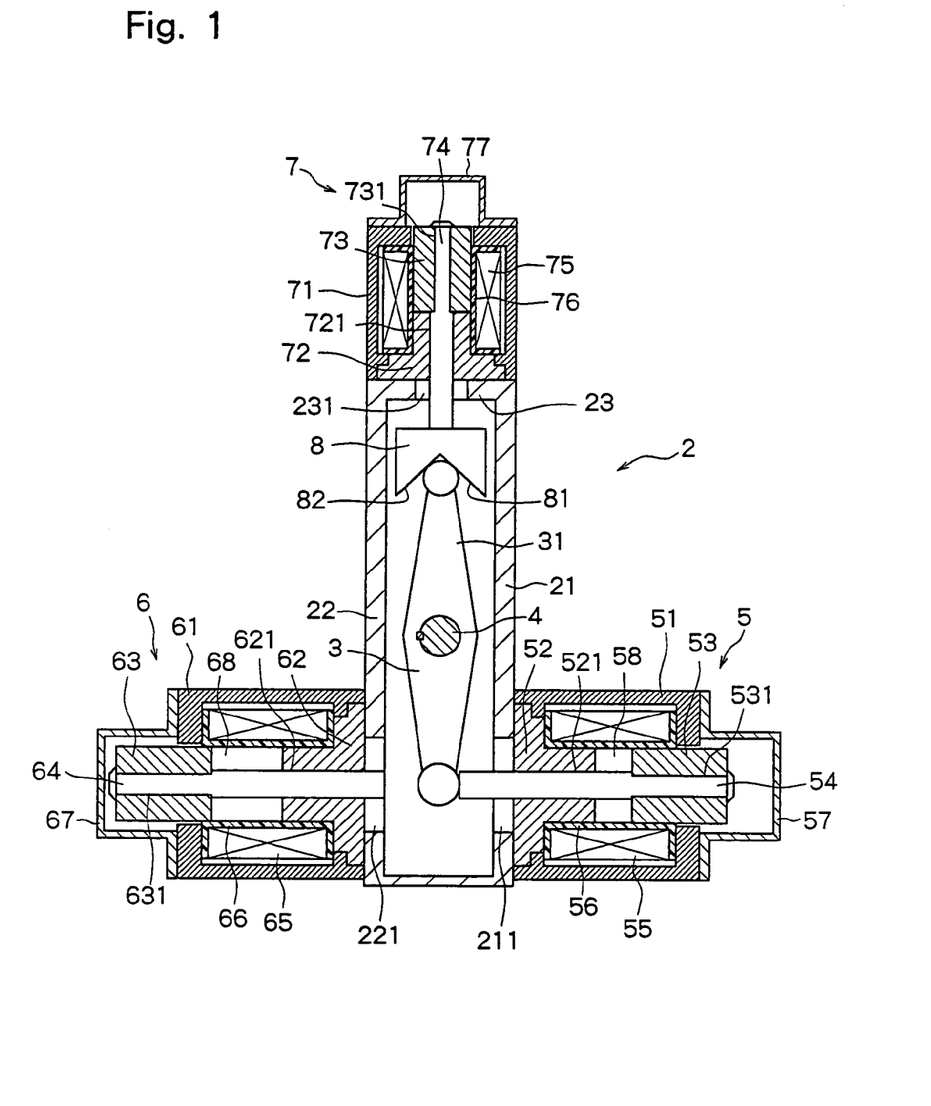
FIG. 1 is a sectional view illustrating a first embodiment of a shift actuator for a transmission constituted according to the present invention.

FIG. 1 illustrates a first embodiment of the shift actuator for the transmission constituted according to the present invention. The actuator illustrated in FIG. 1 has a housing 2. In the housing 2, there is disposed an operation lever 3 for operating a shifting shaft 4 that constitutes a shifting mechanism of the transmission. An intermediate portion of the operation lever 3 is mounted on the shifting shaft 4. On the lower portions of both side walls 21 and 22 of the housing 2, there are mounted a first electromagnetic solenoid 5 for operating the operation lever 3, i.e., the shifting mechanism of the transmission, to a first shifted position and a second electromagnetic solenoid 6 for operating it to a second shifted position.

The first electromagnetic solenoid 5 has a cylindrical casing 51 made of a magnetic material. A fixed yoke 52 made of a magnetic material is mounted on the left end of the casing 51 in the drawing. The fixed yoke 52 protrudes in the casing 51, and has a through-hole 521 formed in the central portion thereof. Further, a moving yoke 53 is so disposed in the casing 51 on the right side in the drawing as to come in contact with, and separate away from, the fixed yoke 52. The moving yoke 53 is made of a magnetic material, and has a through-hole 521 formed in the central portion thereof. An operation rod 54 made of a nonmagnetic material such as a stainless steel is coupled, at its right end in the drawing, to the moving yoke 53. That is, the operation rod 54 is inserted at its right end in the through-hole 521 formed in the central portion of the moving yoke 53, and is coupled to the moving yoke 53 by caulking the right end thereof in the drawing. The operation rod 54 is disposed by being inserted in the through hole 521 formed in the central portion of the fixed yoke 52, and is so constituted, at its left end in the drawing, as to allow to advance into, and retreat from, the housing 2 through a hole 211 formed in the right side wall 21 of the housing 2. The left end of the operation rod 54 is disposed facing the lower end of the operation lever 3, and is so constituted as to act on the lower end of the operation lever 3. An electromagnetic coil 55 is disposed, in the casing 51, so as to surround the fixed yoke 52 and the moving yoke 53. The electromagnetic coil 55 is wound on a bobbin 56 made of a nonmagnetic material such as a synthetic resin or the like, and is disposed along the inner peripheral surface of the casing 51. A cover member 57 for covering the moving yoke 53 is mounted on the right end in the drawing of the casing 51.

Next, the second electromagnetic solenoid 6 will be described. The second electromagnetic solenoid 6 is constituted by the members which are substantially the same as the above members constituting the first electromagnetic solenoid 5, and is disposed facing the first electromagnetic solenoid 5.

That is, the second electromagnetic solenoid 6, too, comprises a cylindrical casing 61, a fixed yoke 62, an operation rod 64, an electromagnetic coil 65, a bobbin 66 and a cover member 67. The right end of the operation rod 64 of the thus constituted second electromagnetic solenoid 6 is so disposed as to allow to advance into, and retreat from, the housing 2 through a hole 221 formed in the left side wall 22 of the housing 2 and is so constituted as to act on the lower end of the operation lever 3.

In the shift actuator of the first embodiment, the upper portion in FIG. 1 of the operation lever 3 mounted, at its intermediate portion, on the shifting shaft 4 works as a neutral operation member 31 mounted on the shifting mechanism. The neutral operation member 31 may have the operation lever 3 that is separately formed and is mounted on the shifting shaft 4. The shift actuator of the first embodiment has a neutral limitation member 8 that acts on the neutral operation member 31 and limits the neutral operation member 31 to a neutral position illustrated in FIG. 1. The neutral limitation member 8 has two operation surfaces 81 and 82 formed in an inverse V-shape expanding downward in FIG. 1. The thus constituted neutral limitation member 8 is so constituted as to move between the first position illustrated in FIG. 2 and the second position illustrated in FIG. 1, and is actuated by an electromagnetic solenoid for neutral 7.

The electromagnetic solenoid for neutral 7 is mounted on an upper wall 23 of the housing 2 in a top portion of the operation lever 3. The electromagnetic solenoid for neutral 7 has the same constitution as those of the first electromagnetic solenoid 5 and the second electromagnetic solenoid 6, and comprises a cylindrical casing 71 made of a magnetic material, a fixed yoke 72 made of a magnetic material and mounted on an end of the casing 71 on the side of the housing 2, a moving yoke 73 that is so disposed as to come in contact with, and separates away from, the fixed yoke 72, an operation rod 74 made of a nonmagnetic material mounted, at its one end, on the moving yoke 73, an electromagnetic coil 75 that surrounds the fixed yoke 72 and the moving yoke 73 and is wound on a bobbin 76, and a cover member 77 mounted on the other end of the casing 71 to cover the moving yoke 73. In the thus constituted electromagnetic solenoid for neutral 7, the other end of the operation rod 74 is disposed so as to advance into, and retreat from, the housing 2 through a hole 231 formed in the upper wall 23 of the housing 2. The neutral limitation member 8 is mounted on the operation rod 76 of the thus constituted electromagnetic solenoid for neutral 7.

When the electromagnetic coil 75 of the thus constituted electromagnetic solenoid for neutral 7 is energized (turned on) causing the moving yoke and the operation rod 74 to move downward in FIG. 1, the neutral limitation member 8 mounted on the operation rod 74 is brought to the second position illustrated in FIG. 1. As a result, the operation surfaces 81 and 82 formed in the neutral limitation member 8 act on the neutral operation member 31, and brings the neutral operation member 31 to the neutral position illustrated in FIG. 1 and limits its operation. When the operation lever 3 is moved to the first shifted position and to the second shifted position due to the first electromagnetic solenoid 5 or the second electromagnetic solenoid 6 as will be described later, the neutral limitation member 8 moves to the first position illustrated in FIG. 2 due to the action of the operation surface 81 or 82, permitting the operation of the neutral operation member 31 formed integrally with the operation lever 3.

The shift actuator in the embodiment illustrated in FIG. 1 is constituted as described above. FIG. 1 illustrates a state where the shift actuator is located at the neutral position. The action of the shift actuator will now be described with reference to FIG. 2 hereinafter.

Figure 2:
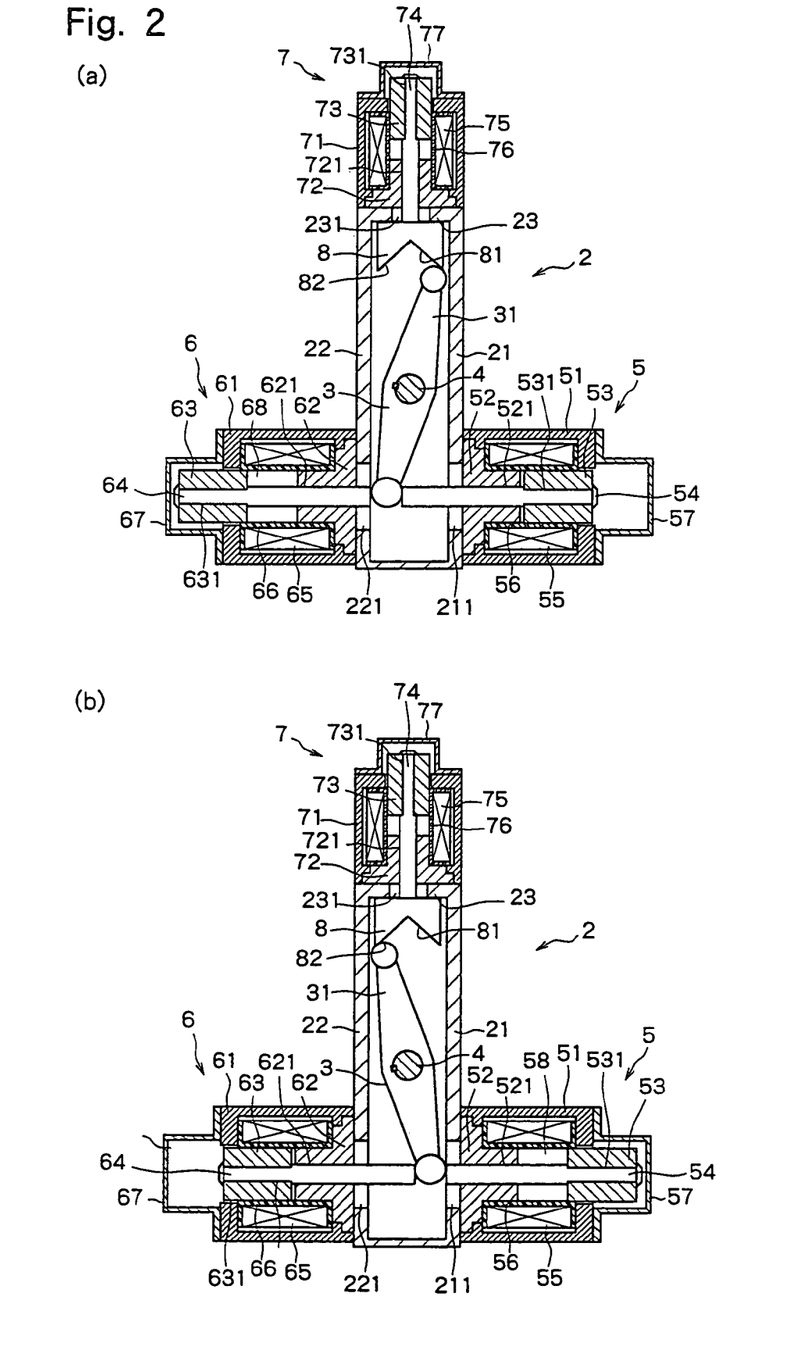
FIGS. 2(a) and 2(b) are each a view illustrating the operating states of the shift actuator illustrated in FIG. 1.

When the electromagnetic coil 55 of the first electromagnetic solenoid 5 constituting the shift actuator is energized (turned on) in the state of the neutral position illustrated in FIG. 1 (in the state where the electromagnetic coil 75 of the electromagnetic solenoid for neutral 7 is de-energized (turned off)), the moving yoke 53 is attracted by the fixed yoke 52 as illustrated in FIG. 2(*a*). Therefore, the operation rod 54 mounted on the moving yoke 53 moves toward the left in FIG. 2 to act, at its end, on the operation lever 3, and the operation lever 3 is brought to the first shifted position illustrated in FIG. 2(*a*). As a result, the shifting shaft 4 turns clockwise in the drawing, and a shifting lever (not shown) constituting the shifting mechanism mounted on the shifting shaft 4 is shifted in the first direction. On this occasion, since the electromagnetic solenoid for neutral 7 has been de-energized (turned off), the neutral limitation member 8 moves upward as shown in FIG. 2(*a*) due to the action of the cam surface 81 that comes into engagement with the neutral operation member 31 formed integrally with the operation lever 3 and is brought to the first position to permit the operation of the neutral operation member 31.

When the electromagnetic coil 65 of the second electromagnetic solenoid 6 is energized (turned on), on the other hand, the moving yoke 63 is attracted by the fixed yoke 62 as illustrated in FIG. 2(*b*). Therefore, the operation rod 64 mounted on the moving yoke 63 moves toward the right in FIG. 2 to act, at its end, on the operation lever 3 and causes the operation lever 3 to be brought to the second shifted position illustrated in FIG. 2(*b*). As a result, the shifting shaft 4 turns counterclockwise in the drawing, and the shifting lever (not shown) constituting the shifting mechanism mounted on the shifting shaft 4 is shifted in the second direction. On this occasion, since the electromagnetic solenoid for neutral 7 has been de-energized (turned off), the neutral limitation member 8 moves upward as shown in FIG. 2(*b*) due to the action of the cam surface 82 that comes into engagement with the neutral operation member 31 formed integrally with the operation lever 3, and is brought to the first position to permit the operation of the neutral operation member 31.

Next, described below is the case of the operation to the neutral position from the state of the first shifted position or the second shifted position illustrated in FIG. 2(*a*) or 2(*b*) (the state where the electromagnetic coil 55 of the first electromagnetic solenoid 5 and the electromagnetic coil 65 of the second electromagnetic solenoid 6 have been de-energized (turned off)).

To move the shifting mechanism to the neutral position, the electromagnetic coil 75 of the electromagnetic solenoid for neutral 7 is energized (turned on). When the electromagnetic coil 75 is energized (turned on), the moving yoke 73 is attracted by the fixed yoke 72, and the operation rod 74 mounted on the moving yoke 73 and the neutral limitation member 8 mounted on the operation rod 74 are moved downward as illustrated in FIG. 1 to be brought to the second position. As a result, the operation surfaces 81 and 82 of the neutral limitation member 8 act on the neutral operation member 31, and reliably brings the neutral operation member 31 to the neutral position illustrated in FIG. 1 and limits its operation. Thereby, the shifting mechanism mounted on the shifting shaft 4 on which the neutral operation member 31 is mounted, is reliably brought to the neutral position.

Next, a second embodiment of the shift actuator of the transmission constituted by the present invention will be described with reference to FIGS. 3 and 4. In the second embodiment illustrated in FIGS. 3 and 4, the same members as those of the first embodiment illustrated in FIGS. 1 and 2 are denoted by the same reference numerals but their detailed description is not repeated.

Figure 3:
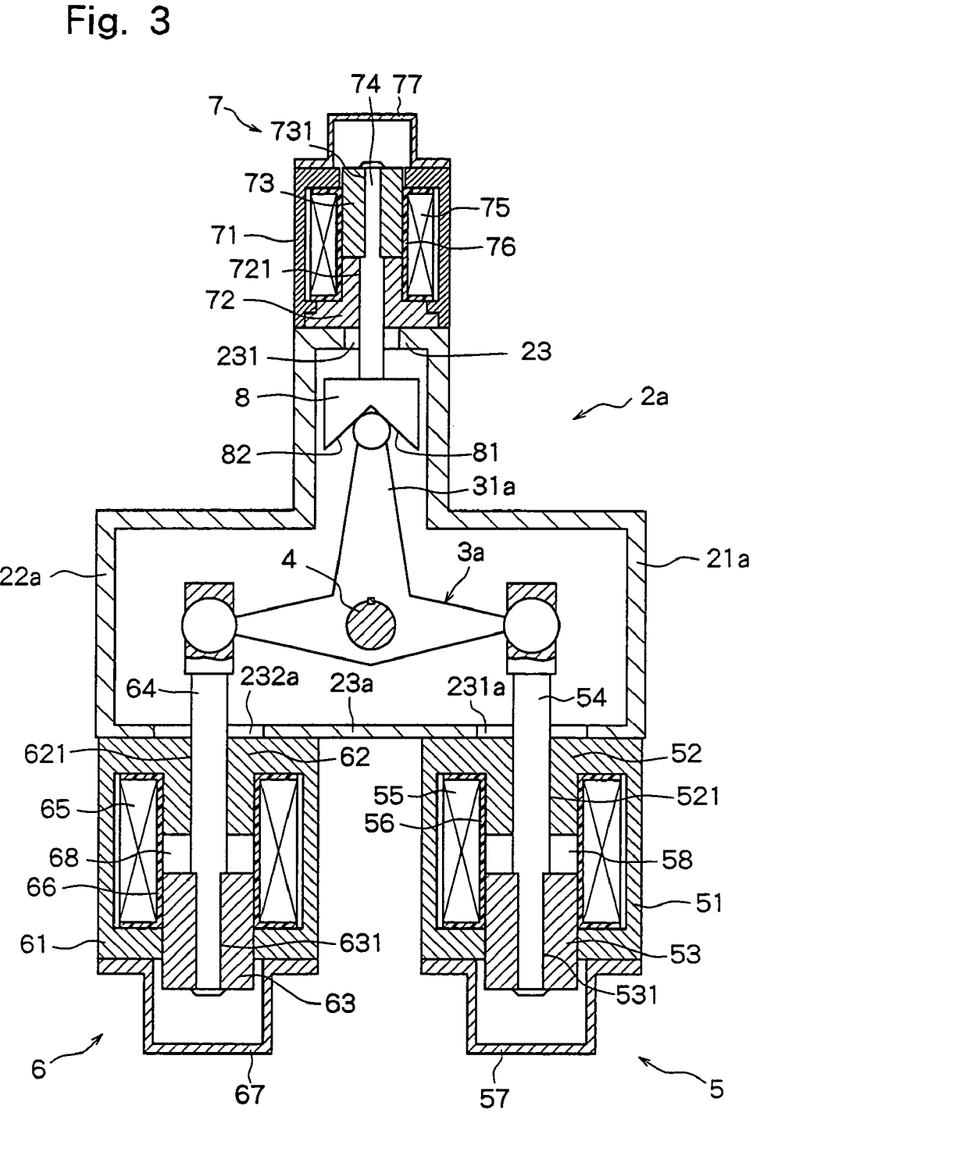
FIG. 3 is a sectional view illustrating a second embodiment of the shift actuator for the transmission constituted according to the present invention.
Figure 4:
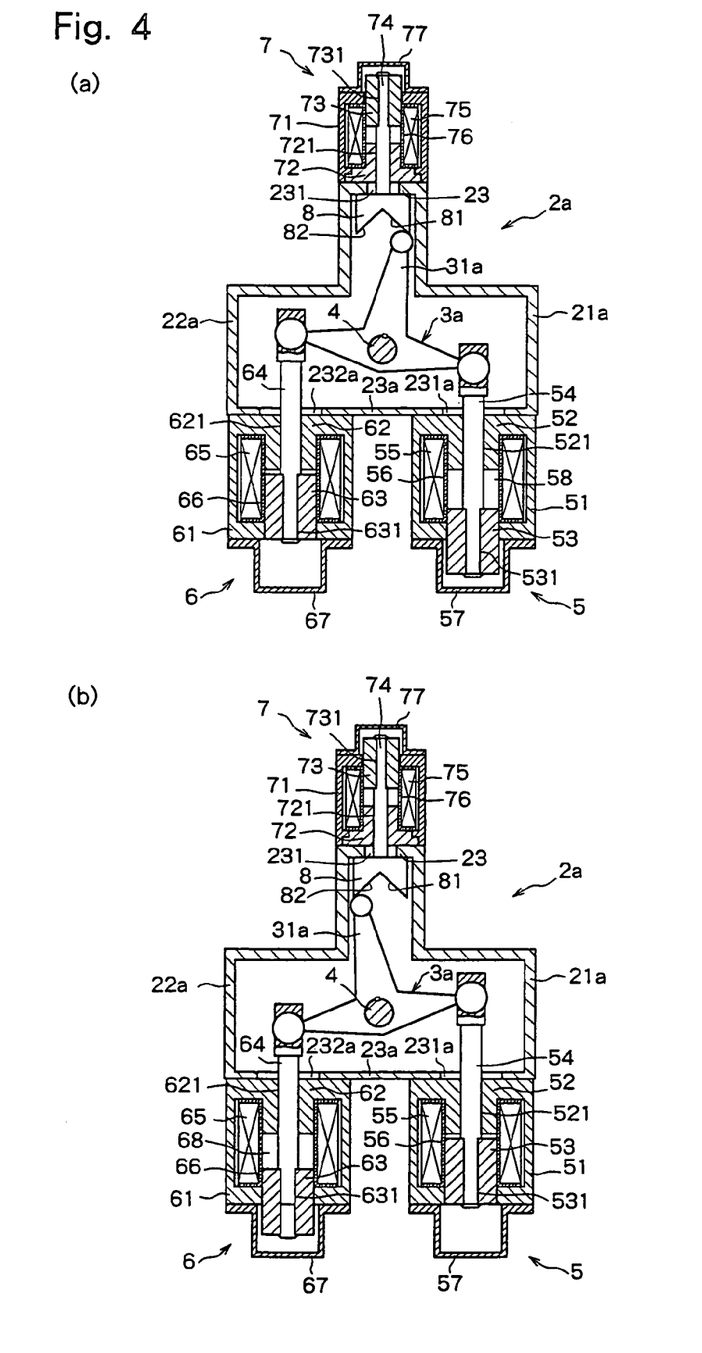
FIGS. 4(a) and 4(b) are each a view illustrating the operating states of the shift actuator illustrated in FIG. 3.

The shift actuator of the second embodiment illustrated in FIGS. 3 and 4, too, is equipped with a housing 2*a*. In the housing 2*a*, there is disposed an operation lever 3*a* which is mounted, at its intermediate portion, on the shifting shaft 4 that constitutes the shifting mechanism of the transmission. On the bottom wall 23*a* of the housing 2*a*, there are mounted a first electromagnetic solenoid 5 and a second electromagnetic solenoid 6 for operating the operation lever 3 in the directions opposite to each other.

The first electromagnetic solenoid 5 and the second electromagnetic solenoid 6 are constituted in substantially the same manner as the first electromagnetic solenoid 5 and the second electromagnetic solenoid 6 of the first embodiment and hence, the same members are denoted by the same reference numerals but their detailed description is not repeated. In the second embodiment, an operation rod 54 constituting the first electromagnetic solenoid 5 is inserted in a hole 231*a* formed in the bottom wall 23*a* of the housing 2*a*, and its upper end is coupled to the right end in the drawing of the operation lever 3*a*. Further, an operation rod 64 constituting the second electromagnetic solenoid 6 is inserted in a hole 232*a* formed in the bottom wall 23*a* of the housing 2*a*, and its upper end is coupled to the left end in the drawing of the operation lever 3*a*.

The operation lever 3*a* in the embodiment illustrated in FIG. 3 has a neutral operation member 31*a* extending nearly perpendicularly from the intermediate portion thereof. The shift actuator of the second embodiment, too, has the neutral limitation member 8 shown in FIG. 1, which acts on the neutral operation member 31*a* to limit the neutral operation member 31*a* to the neutral position illustrated in FIG. 1, and the electromagnetic solenoid for neutral 7 for operating the neutral limitation member 8. The neutral limitation member 8 and the electromagnetic solenoid for neutral 7 are constituted in substantially the same manner as the neutral limitation member 8 and the electromagnetic solenoid for neutral 7 of the above first embodiment. Therefore, the same members are denoted by the same reference numerals but their description is not repeated.

The shift actuator according to the second embodiment is constituted as described above, and FIG. 3 illustrates a state where the shift actuator is brought to the neutral position. The action of the shift actuator will now be described with reference to FIG. 4.

When the electromagnetic coil 65 of the second electromagnetic solenoid 6 constituting the shift actuator is energized (turned on) in the state of the neutral position illustrated in FIG. 3 (in the state where the electromagnetic coil 75 of the electromagnetic solenoid for neutral 7 is de-energized (turned off)), the moving yoke 63 is attracted by the fixed yoke 62 as illustrated in FIG. 4(*a*). Therefore, the operation rod 64 mounted on the moving yoke 63 moves upward in FIG. 4, and the operation lever 3*a* coupled, at its left end, to the upper end of the operation rod 64 is brought to the first shifted position illustrated in FIG. 4(*a*). As a result, the shifting shaft 4 turns clockwise in the drawing, and a shifting lever (not shown) constituting the shifting mechanism mounted on the shifting shaft 4 is shifted in the first direction. The operation rod 54 and the moving yoke 53 of the first electromagnetic solenoid 5 coupled to the right end of the operation lever 3*a* are moved downward. Meanwhile, since the electromagnetic solenoid for neutral 7 has been de-energized (turned off), the neutral limitation member 8 moves upward as shown in FIG. 4(*a*) due to the action of the cam surface 81 that comes into engagement with the neutral operation member 31*a* formed integrally with the operation lever 3*a*, and is brought to the first position to permit the operation of the neutral operation member 31*a*.

When the electromagnetic coil 55 of the first electromagnetic solenoid 5 is energized (turned on), on the other hand, the moving yoke 53 is attracted by the fixed yoke 52 as illustrated in FIG. 4(*b*). Therefore, the operation rod 54 mounted on the moving yoke 53 moves upward in FIG. 4 and the operation lever 3*a* coupled, at its right end, to the upper end of the operation rod 54 is brought to the second shifted position illustrated in FIG. 4(*b*). As a result, the shifting shaft 4 turns counterclockwise in the drawing, and the shifting lever (not shown) constituting the shifting mechanism mounted on the shifting shaft 4 is shifted in the second direction. The operation rod 64 and the moving yoke 63 of the second electromagnetic solenoid 6 coupled to the left end of the operation lever 3*a* are moved downward. Meanwhile, since the electromagnetic solenoid for neutral 7 has been de-energized (turned off), the neutral limitation member 8 moves upward as shown in FIG. 4(*b*) due to the action of the cam surface 82 that comes into engagement with the neutral operation member 31*a* formed integrally with the operation lever 3*a*, and is brought to the first position to permit the operation of the neutral operation member 31*a*.

Next, described below is the case of the operation to the neutral position from the state of the first shifted position or the second shifted position illustrated in FIG. 4(*a*) or 4(*b*) (the state where the electromagnetic coil 55 of the first electromagnetic solenoid 5 and the electromagnetic coil 65 of the second electromagnetic solenoid 6 have been de-energized (turned off)).

To operate the shifting mechanism to the neutral position, the electromagnetic coil 75 of the electromagnetic solenoid for neutral 7 is energized (turned on). When the electromagnetic coil 75 is energized (turned on), the moving yoke 73 is attracted by the fixed yoke 72, and the operation rod 74 mounted on the moving yoke 73 and the neutral limitation member 8 mounted on the operation rod 74 are moved downward as illustrated in FIG. 3 and are brought to the second position. As a result, the operation surfaces 81 and 82 of the neutral limitation member 8 act on the neutral operation member 31*a*, and reliably brings the neutral operation member 31*a* to the neutral position illustrated in FIG. 3 and limits its operation. Thereby, the shifting mechanism mounted on the shifting shaft 4 on which the neutral operation member 31*a* is mounted, is reliably brought to the neutral position.

Figure 5:
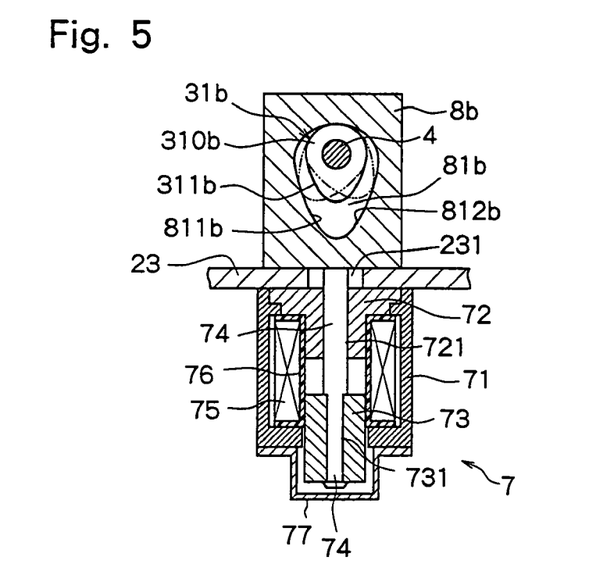
FIG. 5 is a sectional view illustrating a third embodiment of the shift actuator for the transmission constituted according to the present invention.
Figure 6:
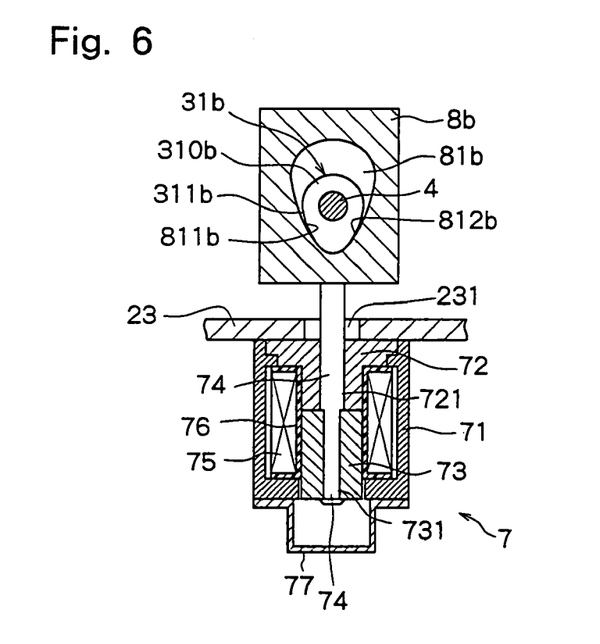
FIG. 6 is a view illustrating the operating state of the shift actuator illustrated in FIG. 5.

Next, a third embodiment of the shift actuator of the transmission constituted by the present invention will be described with reference to FIGS. 5 and 6 which illustrate the neutral operation member 31*b* that constitutes the shift actuator of the transmission, the neutral limitation member 8*b* and the electromagnetic solenoid for neutral 7. The neutral operation member 31*b* that constitutes the shift actuator of the third embodiment illustrated in FIGS. 5 and 6, is mounted on the shifting shaft 4 that constitutes the shifting mechanism of the above first and second embodiment. The neutral operation member 31*b* comprises a cam 310*b* having a cam surface 311*b* along the outer circumference thereof. The neutral limitation member 8*b* is made of a plate member and is mounted on the operation rod 74 of the electromagnetic solenoid for neutral 7. The neutral limitation member 8*b* has a hole 81*b* surrounding the cam 310*b*, and cam operation surfaces 811*b* and 812*b* for operating the cam 310*b* are formed on the inner peripheral surface of the hole 81*b*. The neutral limitation member 8*b* is so constituted as to allow to operate between a first position illustrated in FIG. 5 and a second position illustrated in FIG. 6. In the state of the first position illustrated in FIG. 5, the cam operation surfaces 811*b* and 812*b* formed in the neutral limitation member 8*b* have a shape that permits the operation of the cam 310*b* together with the shifting shaft 4 to the first shifted position or to the second shifted position indicated by two-dot chain lines in FIG. 5. At the second position illustrated in FIG. 6, further, the cam operation surfaces 811*b* and 812*b* are formed into a shape that acts on the cam surface 311*b* of the cam 310*b* to bring the cam 130*b* to the neutral position between the first shifted position and the second shifted position and limits its operation. The electromagnetic solenoid for neutral 7 is constituted in substantially the same manner as the electromagnetic solenoid for neutral 7 of the first and second embodiments, and the same members are denoted by the same reference numerals but their description is not repeated.

The shift actuator according to the third embodiment illustrated in FIGS. 5 and 6 is constituted as described above, and FIG. 5 illustrates a state where the neutral limitation member 8*b* is brought to the first position. As described in the above first and second embodiments, therefore, when the shifting operation is effected by operating the first electromagnetic solenoid 5 and the second electromagnetic solenoid 6, the cam 310*b* as the neutral operation member 31*b* mounted on the shifting shaft 4 is allowed to be operated to the first shifted position and to the second shifted position indicated by the two-dot chain lines in FIG. 5.

The electromagnetic coil 75 of the electromagnetic solenoid for neutral 7 is energized (turned on) in order for the cam 310*b* as the neutral operation member 31*b* to move the shifting mechanism to the neutral position from a state where it is brought to the first shifted position or the second shifted position indicated by the two-dot chain line in FIG. 5. When the electromagnetic coil 75 is energized (turned on), the moving yoke 73 is attracted by the fixed yoke 72, whereby the operation rod 74 mounted on the moving yoke 73 and the neutral limitation member 8*b* mounted on the operation rod 74 move upward and are brought to the second position illustrated in FIG. 6. As a result, the cam operation surfaces 811*b* and 812*b* formed in the neutral limitation member 8*b* act on the cam surface 311*b* of the cam 310*b* as the neutral operation member 31*b* to reliably bring the cam 310*b* to the neutral position illustrated in FIG. 6 and limits its operation. Thereby, the shifting mechanism mounted on the shifting shaft 4 on which the cam 310*b* is mounted is reliably brought to the neutral position.

Next, a fourth embodiment of the shift actuator of the transmission constituted according to the present invention will be described with reference to FIGS. 7 to 10. The fourth embodiment illustrated in FIGS. 7 to 10 comprises a neutral operation member 31*c*, a neutral limitation member 8*c* and an electromagnetic solenoid for neutral 7 that constitute the shift actuator of the transmission like the third embodiment illustrated in FIGS. 5 and 6, and the same members are denoted by the same reference numerals but their detailed description is not repeated.

Figure 7:
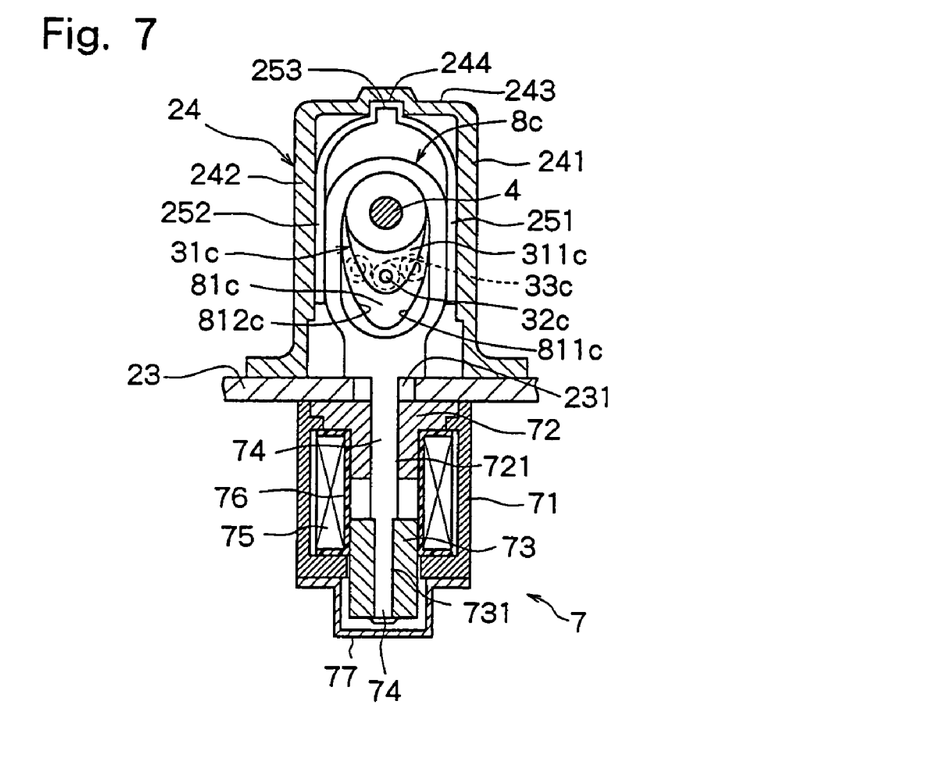
FIG. 7 is a front view of a major portion illustrating a fourth embodiment of the shift actuator constituted according to the present invention.
Figure 8:
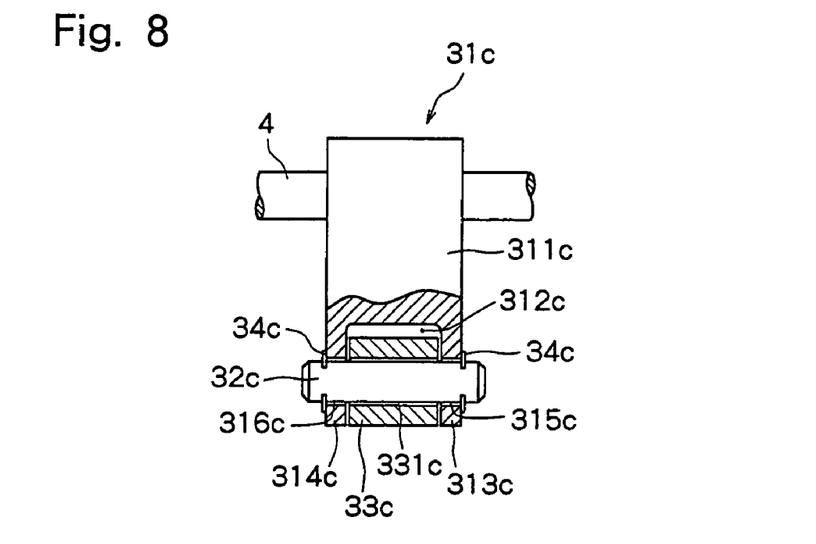
FIG. 8 is a side view illustrating, partly in cut-away manner, a neutral operation member that constitutes the shift actuator illustrated in FIG. 7.

The neutral operation member 31c constituting the shift actuator of the fourth embodiment illustrated in FIGS. 7 to 10 is mounted on the shifting shaft 4 that constitutes the shifting mechanism of the above first or second embodiment. The neutral operation member 31c comprises a roller support member 311c protruding in the radial direction, and a roller 33c rotatably supported by a support shaft 32c disposed at an end of the roller support member 311c in parallel with the shifting shaft 4. Referring to FIG. 8, a notch 312c is formed in the end of the roller support member 311c, and support portions 313c and 314c are formed on both sides of the notch 312c in the axial direction of the shifting shaft 4 in parallel with each other. The roller 33c is disposed in the notch 312c of the thus constituted roller support member 311c, and the support shaft 32c is inserted in the holes 315c, 316c formed in the support portions 313c, 314c and in the hole 331c formed in the central portion of the roller 33c, so that the roller 33c is rotatably supported by the support shaft 32c. Snap rings 34c and 34c are fitted to both ends of the support shaft 32c to prevent the support shaft 32c from escaping.

Figure 9:
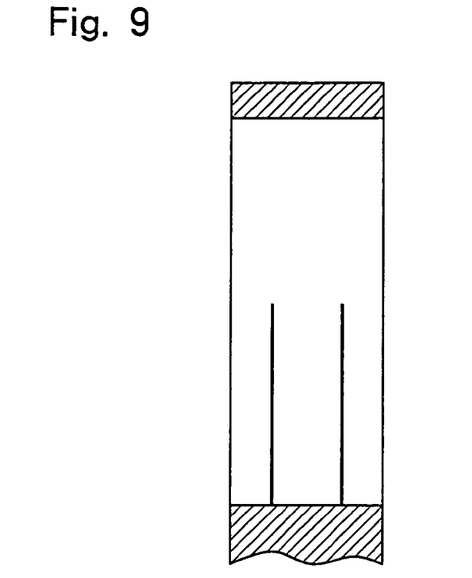
FIG. 9 is a sectional view illustrating a major portion of the neutral limitation member that constitutes the shift actuator illustrated in FIG. 7.

The neutral limitation member 8c is formed by using a plate member and is mounted on the operation rod 74 of the electromagnetic solenoid for neutral 7. The neutral limitation member 8c has a hole 81c surrounding the roller support member 311c and the roller 33c, and roller operation surfaces 811c and 812c are formed on the inner peripheral surface of the lower half portion of the hole 81c, for operating the roller 33c. The inner peripheral surface of the lower half portion of the hole 81c has its both sides cut away as illustrated in FIG. 9 to form a roller operation surface 811c (812c) on the central portion thereof, the width of the roller operation surface 811c (812c) being set to be smaller than the length of the roller 33c in the axial direction thereof.

Referring to FIG. 7, the neutral limitation member 8c is disposed in a cover member 24 that is provided on the upper wall 23 of the housing. The inner surfaces of both side walls 241 and 242 of the cover member 24 work as a guide portion for guiding the motion of the neutral limitation member 8c in the up-and-down direction in FIG. 7. In the illustrated embodiment, slide bushes 251 and 252 made of a synthetic resin having a small coefficient of friction are fitted to the inner surfaces of both side walls 241 and 242 of the cover member 24. In the illustrated embodiment, the slide bushes 251 and 252 are molded as a unitary structure with their upper ends being connected together, and a projection 253 formed at the connection portion is fitted into a recessed portion 244 formed in the inner surface of the upper wall 243 of the cover member 24 so as to be mounted on the cover member 24.

The shift actuator of the fourth embodiment illustrated in FIGS. 7 to 10 is constituted as described above. Described below is the operation thereof.

FIG. 7 illustrates a state where the neutral limitation member 8c is brought to the first position. In executing the shifting operation by energizing the first electromagnetic solenoid 5 and the second electromagnetic solenoid 6 as described in the above first and third embodiments, therefore, the roller support member 311c as the neutral operation member 31c mounted on the shifting shaft 4 and the roller 33c are permitted to be moved to the first shifted position and to the second shifted position indicated by two-dot chain lines in FIG. 7.

The electromagnetic coil 75 of the electromagnetic solenoid for neutral 7 is energized (turned on) to operate the shifting mechanism to the neutral position from a state where the roller support member 311c as the neutral operation member 31c and the roller 33c are located at the first shifted position or the second shifted position indicated by the two-dot chain line in FIG. 7. When the electromagnetic coil 75 is energized (turned on), the moving yoke 73 is attracted by the fixed yoke 72, whereby the operation rod 74 mounted on the moving yoke 73 and the neutral limitation member 8b mounted on the operation rod 74 move upward and are brought to the second position illustrated in FIG. 10. As a result, the cam operation surfaces 811c and 812c formed in the neutral limitation member 8c act on the roller 33c that constitutes the neutral operation member 31c to reliably bring the roller 333 to the neutral position illustrated in FIG. 10 to limit its operation. Thereby, the shifting mechanism mounted on the shifting shaft 4 on which the roller support member 311c supporting the roller 33c is mounted, is reliably brought to the neutral position.

Figure 10:
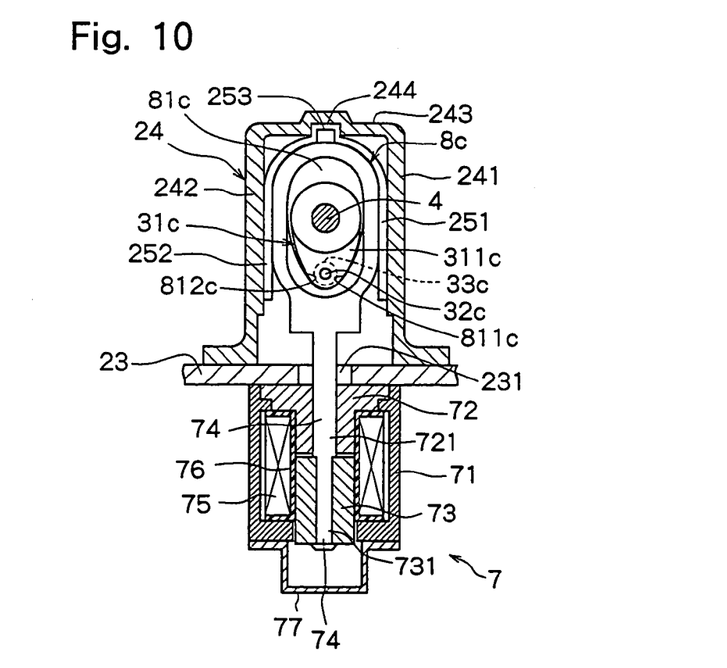
FIG. 10 is a view illustrating the operating state of the shift actuator illustrated in FIG. 7.

According to the shift actuator of the fourth embodiment illustrated in FIGS. 7 to 10 as described above, when the electromagnetic solenoid for neutral 7 is operated to bring the neutral limitation member 8c to the second position illustrated in FIG. 10 in order to move the shifting mechanism to the neutral position, the roller operation surfaces 811c and 812c formed in the neutral limitation member 8c act, with a small contact resistance, on the roller 33c that constitutes the neutral operation member 31c and hence, assure smooth operation. In the illustrated embodiment, further, the neutral operation member 31c is guided by the slide bushes 251 and 252 made of a synthetic resin having a small coefficient of friction fitted onto the inner surfaces of the two side walls 241 and 242 of the cover member 24. Owing to their small slide resistances, therefore, the operation is smoothly carried out.

The invention claimed is:

1. A shift actuator for a transmission, comprising:
   a first electromagnetic solenoid for operating a shifting mechanism of the transmission to a first shifted position;
   a second electromagnetic solenoid for operating the shifting mechanism to a second shifted position;
   a neutral operation member mounted on the shifting mechanism for bringing the shifting mechanism to a neutral position lying between the first shifted position and the second shifted position;
   a neutral limitation member movable between a first position, in which said neutral operation member is permitted to be operated to the first shifted position and to the second shifted position, and a second position, in which said neutral operation member is brought to the neutral position; and
   an electromagnetic solenoid for neutral, which brings said neutral limitation member to the second position,
   wherein said neutral limitation member has two operation surfaces formed in a V-shape so as to act on said neutral operation member, and, when brought to the second position, brings said neutral operation member to the neutral position and limits its operation.

2. A shift actuator for a transmission, comprising:
   a first electromagnetic solenoid for operating a shifting mechanism of the transmission to a first shifted position;
   a second electromagnetic solenoid for operating the shifting mechanism to a second shifted position;

a neutral operation member mounted on the shifting mechanism for bringing the shifting mechanism to a neutral position lying between the first shifted position and the second shifted position;

a neutral limitation member movable between a first position, in which said neutral operation member is permitted to be operated to the first shifted position and to the second shifted position, and a second position, in which said neutral operation member is brought to the neutral position; and an electromagnetic solenoid for neutral, which brings said neutral limitation member to the second position, wherein:

said neutral operation member comprises a cam mounted on a shifting shaft of the shifting mechanism, said cam having a cam surface on the outer periphery thereof; and said neutral limitation member has a hole with cam operation surfaces that surround said cam and act on said cam surface and, when said neutral limitation member is brought to the second position, said cam operation surfaces bringing said cam to the neutral position and limit its operation.

3. A shift actuator for a transmission, comprising:

a first electromagnetic solenoid for operating a shifting mechanism of the transmission to a first shifted position;

a second electromagnetic solenoid for operating the shifting mechanism to a second shifted position;

a neutral operation member mounted on the shifting mechanism for bringing the shifting mechanism to a neutral position lying between the first shifted position and the second shifted position;

a neutral limitation member movable between a first position, in which said neutral operation member is permitted to be operated to the first shifted position and to the second shifted position, and a second position, in which said neutral operation member is brought to the neutral position; and an electromagnetic solenoid for neutral, which brings said neutral limitation member to the second position, wherein:

said neutral operation member comprises a roller support member mounted on a shifting shaft of the shifting mechanism and protruding in the radial direction of the shifting shaft, and a roller supported at an end of said roller support member and rotatable on an axis in parallel with the shifting shaft; and said neutral limitation member has a hole with roller operation surfaces that surround said roller support member and said roller, said roller operation surfaces acting on said roller and, when said neutral limitation member is brought to said second position, bringing said roller to the neutral position and limit its operation.

4. A shift actuator for a transmission according to claim 3, further comprising a guide portion for guiding the movement of said neutral limitation member between the first shifted position and the second shifted position.

5. A shift actuator for a transmission according to claim 4, further comprising a slide bush made of a material having a small coefficient of friction, said slide bush being fitted to said guide portion.

* * * * *